E. MONTI.
APPARATUS FOR CONCENTRATING SOLUTIONS IN GENERAL.
APPLICATION FILED APR. 20, 1909.
973,290.
Patented Oct. 18, 1910.
3 SHEETS—SHEET 2.
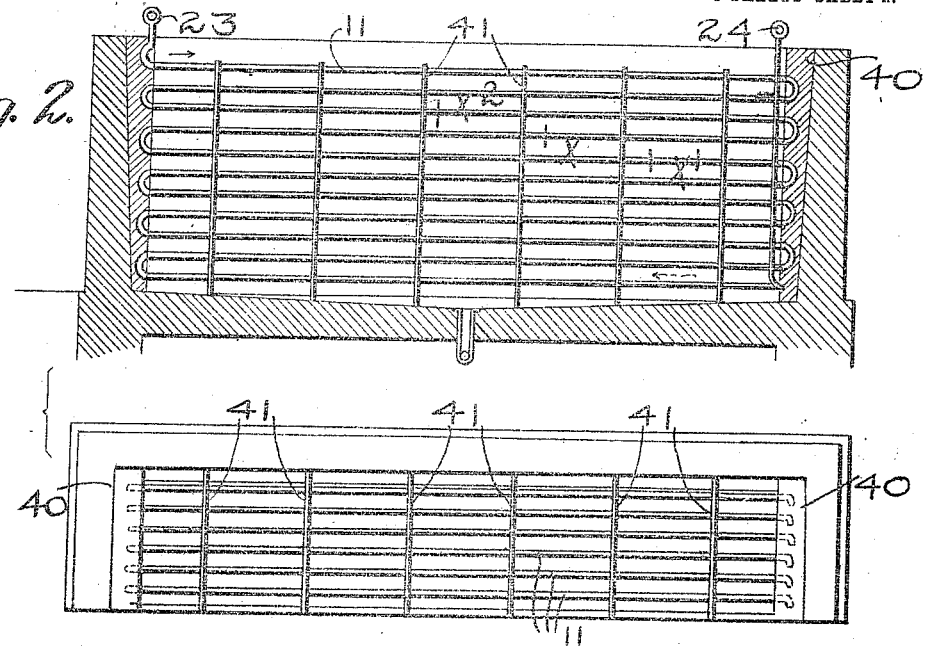
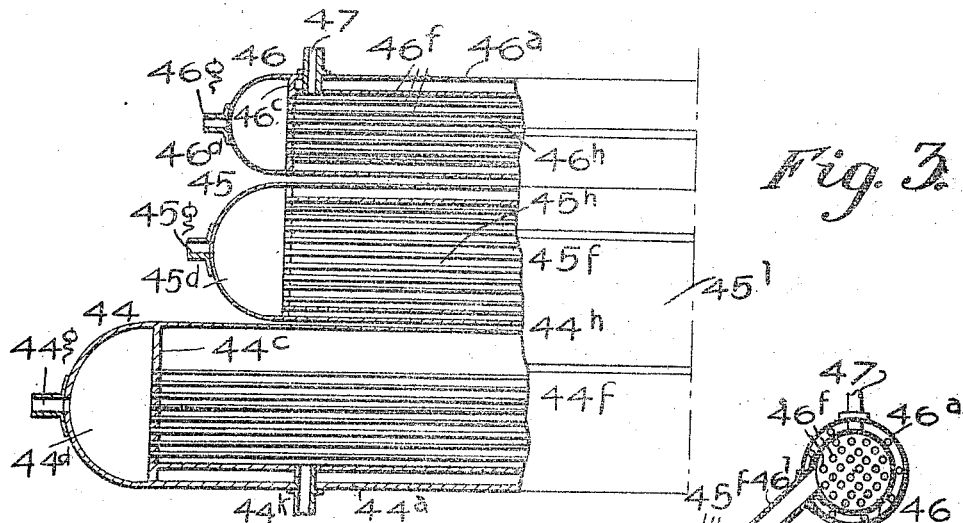
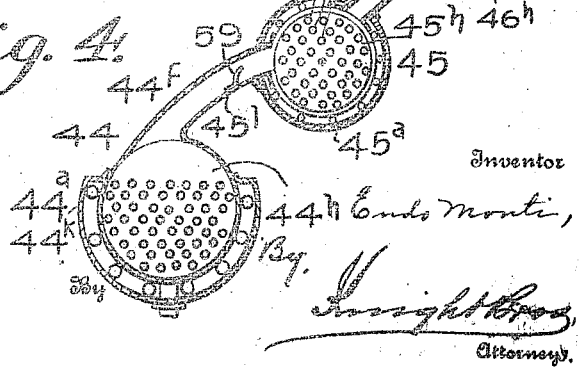

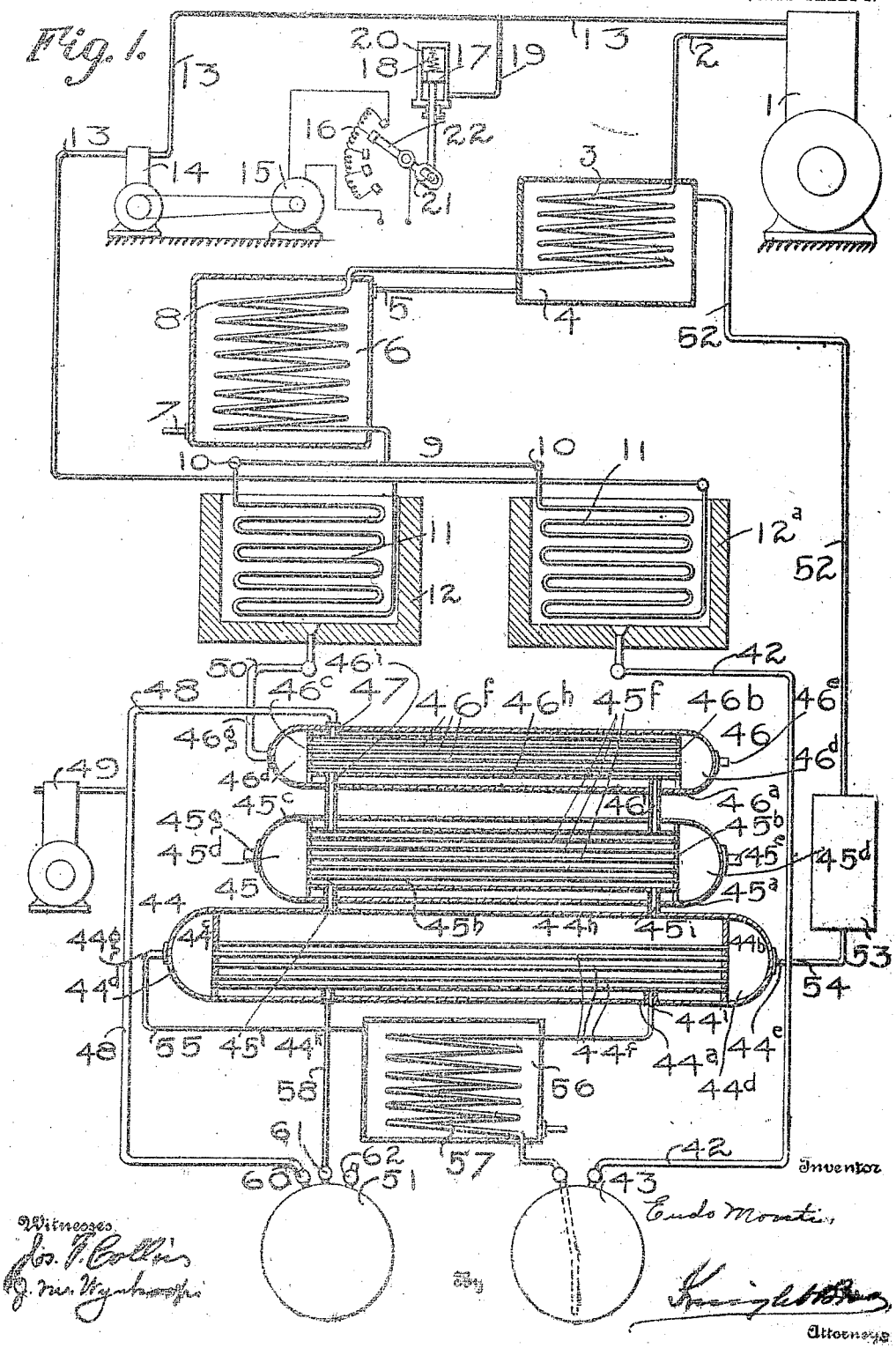

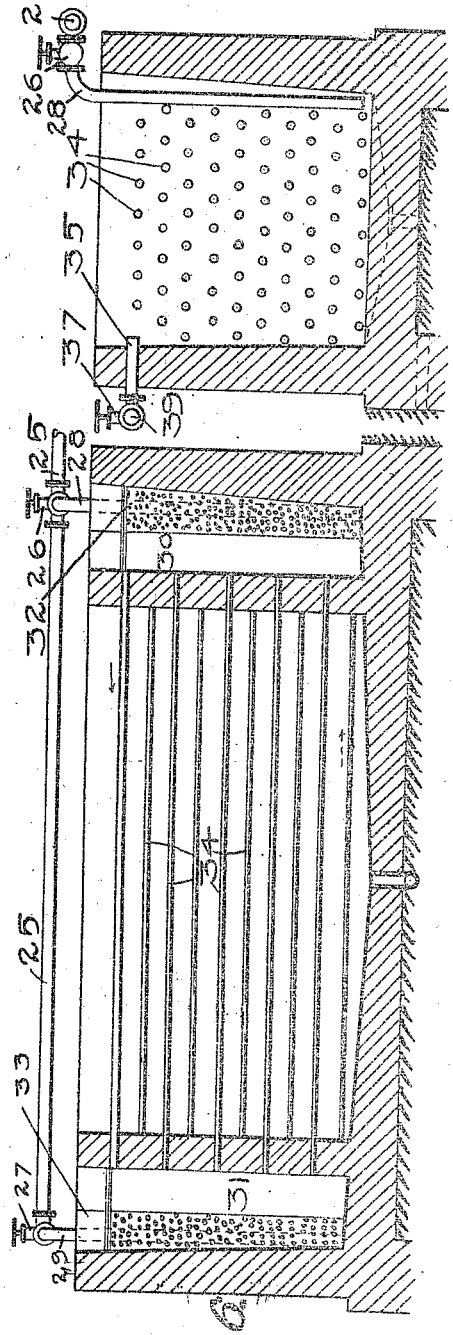
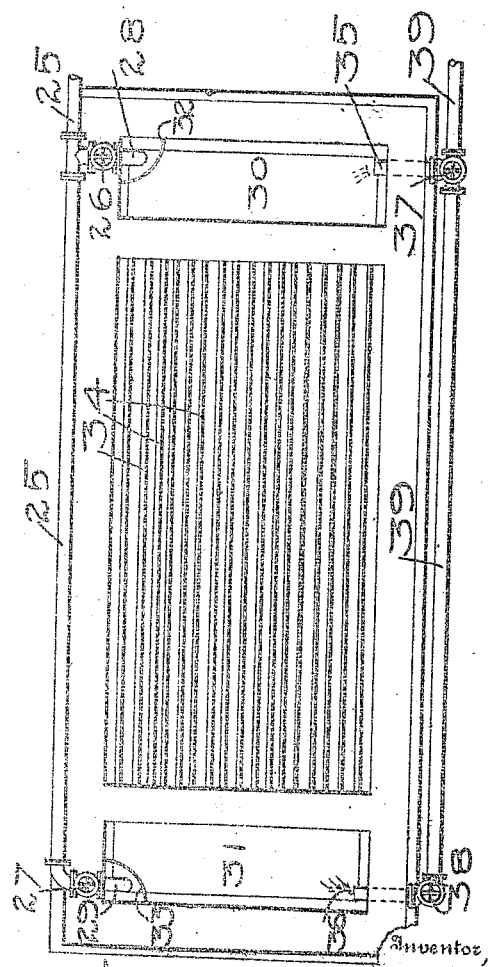

UNITED STATES PATENT OFFICE.

EUDO MONTI, OF TURIN, ITALY.

APPARATUS FOR CONCENTRATING SOLUTIONS IN GENERAL.

973,290.  Specification of Letters Patent.  Patented Oct. 18, 1910.

Application filed April 20, 1909. Serial No. 491,204.

*To all whom it may concern:*

Be it known that I, EUDO MONTI, a subject of the King of Italy, and resident of Turin, Italy, have invented certain new and useful improvements in apparatus for concentrating solutions in general—namely, vegetable extracts, musts, wines, liquors, animal extracts, brines, &c., of which the following is a specification.

The present invention has for its object some improvements in an apparatus for concentrating solutions and refers more particularly to an apparatus for concentration resulting from the combination of an apparatus for concentration by freezing and an apparatus for concentration through evaporation at a reduced pressure.

The process of concentration by evaporation is not nowadays the cheapest. When the steam engines required from 20 to 30 kg. of steam for horse-power-hour, the exhaust steam, used in multiple acting apparatus was quite sufficient to accomplish the concentration of the extracts, even in the manufacture of beetroot sugar or tannic extracts, for the preparation of which solutions at 10% or less of dry extract are used. The modern steam engines, also the steam turbines require only about 6 kilos of steam for horse-power-hour and give but warm water as a byproduct, which would not be available to run a multiple acting concentrating apparatus. Therefore to operate said concentrating apparatus it would be necessary either to use an old time steam-wasting engine or the steam directly produced by a generator burning about 120 kilos of good coal for each ton of steam produced: this latter in its turn, even in a very good multiple acting apparatus, cannot evaporate more than 4 tons of water, this last quantity being reduced to only about 800 kilos when a single acting evaporator must be used, because must, fruit juice, vegetable extracts, meat extract and the like cannot stand a high temperature without becoming altered. Raoult, Spence, Gärber, Miles and the inventor himself have proposed to concentrate said solutions by freezing. The process found by the applicant is practically the most economical and consists in freezing the solution to be concentrated and displacing the soluble matters from the ice crystals by means of more and more diluted solutions, which become richer by thawing through the frozen mass as long as there are soluble substances between the ice crystals. At the end of the operation there remain only a mass of ice crystals free from soluble matters corresponding to the quantity of water extracted from the concentrated solution. But even with this process, which is practically very cheap, it is not possible to separate in one operation more than 50% of the water. The separation of a higher percentage of water is rather difficult, especially if sugary solutions or vegetable extracts are to be treated, owing to the viscosity acquired by the concentrated solution and preventing the regular course of the displacement as well as owing to the difficulties of regulating the ice machine, while the temperature at the evaporator sinks continually becoming lower and lower with the lowering of the freezing point of the concentrated solution. I eliminate all these inconveniences and obtain highly concentrated and crystallizable solutions by means of the hereafter described combined apparatus for the better understanding of which I have shown in the annexed drawings the necessary apparatus.

In said drawings:—Figure 1 is a diagram of a plant; Fig. 2 shows in vertical section, and in plan view a freezing tank; Figs. 3 and 4 are respectively a front view partially sectioned and a cross section of the vacuum concentrating apparatus; Figs. 5, 6 and 7 represent respectively a plan view, a vertical section—a longitudinal section and a cross section of another form of freezing tank.

In order to obtain from the combination of the concentrating process by freezing with the low pressure evaporating process I have invented some improvements in the apparatus for concentration by freezing and in the concentration by evaporation at a reduced pressure, said improvements permitting extraction in one operation of about 75% of the water contained in the original solution and to obtain concentrated solutions averaging 60% and more of dry extract, and to evaporate the solution thus concentrated at a low temperature with a very small consumption of energy or fuel if any. First of all I increase the efficiency of the refrigerating machine by keeping the pressure of the gas drawn in constant even at very low temperatures. I cause the solution to be concentrated to freeze as even as possible by means of a rational distribution of the refrigerating fluid.

In Fig. 1, 1 is the main compressor of the refrigerating plant, the delivery pipe 2 of which is connected with the coil 3 of an interchanger 4, that may be of any suitable form, for instance of the Houdart type, and in which the refrigerating water already slightly warmed coming from the tube 5 of the main condenser circulates in countercurrent. Refrigerating water at the ordinary temperature (12° to 15° C.) is introduced through the tube 7 in said main condenser, in the coil 8 of which the gas coming from the coil 3 of the interchanger 4 circulates and is condensed. Owing to this arrangement the quantity of refrigerating water circulating in the condenser is considerably reduced without diminishing the output of the machine, moreover I obtain water at about 25° C. at the outlet of the interchanger 4. The gas coming from the condenser enters the tube 9, thence, through the expansion valves 10 reaching the refrigerating coils 11 of one or the other of the concentrating tanks 12, $12^a$; leaving said tanks the gas passes through the suction pipe 13 on which is inserted the by-compressor or pressure regulator 14, intended to regulate the pressure in the suction pipe keeping it nearly constant and therefore to keep constant the weight of the gas drawn in (in the unit of time) by the main compressor, the result being to avoid all change in the efficiency of the refrigerating machine whatever may be the temperature in the concentrating tanks. It is well understood that the by-compressor 14 in order to keep constant the pressure in the pipe 13 must either work at a speed varying in inverse ratio to the pressure in the pipe 13 or vary the travel of the piston. This may be effected automatically in several ways. The automatic regulation of the speed of the pump 14 may be obtained easily for instance by operating said pump by means of an electric motor 15 the speed of which may be varied between very large limits by means of the rheostat 16. For the automatic regulation of the rheostat 16 I may use for instance the piston rod 17 contained in the cylinder 18 connected through the shunt 19 with the pipe 13, said piston being continually pressed downward by means of the spring 20 while the handle 22 of the rheostat is articulated in 21 to the piston. It will be seen that if the pressure in 13 increases above the desired point the piston 17 is raised and the handle 22 causes the insertion of a greater resistance to take place, the result being to diminish the speed of the motor and therefore of the compressor 14, whereby the pressure in 13 is caused to sink. On the contrary if the pressure in 13 falls under the desired limit, the piston 17 is lowered, thus decreasing the resistance in the circuit operating the electric motor so that it will run the compressor 14 at a higher speed and thus restoring promptly the required pressure in the pipe 13.

Evidently any other device regulating the speed of the motor, the travel of the piston, the admission of the gas into the by-compressor or any other way for automatically regulating the pressure of the gas in the suction pipe of the main compressor will answer the purpose.

It appears that by means of the by-compressor 14 and without changing the speed of the main compressor 1, it is possible to keep constant the pressure in 13, this being a necessary condition in order to obtain a constant efficiency of the refrigerating machine whatever may be the temperature in the evaporator.

In order to effect an even freezing of the concentrating solution, the density of which is not uniform as during the freezing process the more concentrated solution falls or rises according to its density, it is necessary that each layer be brought to a temperature corresponding to its concentration. For this purpose I have proposed to employ several independent coils arranged at different heights in the freezing tanks and in which the expansion of a suitable quantity of gas is produced in order to obtain the required temperature. I have found that it is not necessary to use said complicated arrangements, as the result may be obtained by using a series of refrigerating coils 11 (Fig. 2) extending from top to bottom of the tank containing the solution to be frozen. If in each of said coils a limited quantity of liquefied gas is introduced in the direction indicated by the arrow in full lines—if the quantity of gas is suitably calculated with regard to the size of the coil and the temperature of the outstanding solution—the gas will remain in the state of saturated vapor in the first turns of said coil for instance to the point X, while in the last turns the gas is superheated, the solution in the different parts of the coil will therefore be cooled at a different temperature. By regulating the quantity of gas introduced in the coil, the absorption of heat, which is constant in the first layers of the solution to be frozen where are the first turns of the coil, will increase more and more as the last turns are reached, where the superheated gas circulates. Therefore, by suitably regulating the quantity of gas introduced in the freezing pipes, very noticeable differences of temperature between the gas evaporating in the upper turns and that of the gas superheating in the lower turns will be obtained. This difference of temperature will remain constant as long as the quantity of gas introduced and the temperature of the liquid surrounding the coils are constant; but if said quantity increases or diminishes, evidently the point X, which is so to say the limit between the two zones of the saturated vapor and the superheated gas, changes its position, viz. it will assume the position X¹ or X². It is therefore possible, by varying the quantity of gas introduced in the coil, to increase or diminish the number of turns in which the gas is evaporated at a constant temperature varying therefore the temperature of the different layers of frozen solution. It is also easy to invert the circulation of the gas as shown by the arrows in dotted lines, cooling thus quickly the lower turns of the coil, this permitting to freeze quickly the lower more concentrated layers of the solution to be frozen, by cooling them to a suitable temperature.

It will be seen that using one series of coils winding from the top to the bottom of the solution to be frozen, it is possible to obtain the subsequent freezing of different layers of the solution and this first by suitably regulating the quantity of gas introduced in the coil and by inverting afterward the direction of the fluid circulating in said coils. This arrangement of the concentrating tank is shown in vertical section and in plan in Fig. 2, in which the different coils 11 arranged in as many vertical planes are connected separately at their upper and lower ends with the collectors 23, 24 respectively through which the compressed gas is alternately admitted and discharged.

The inversion of the circulation of the refrigerating fluid in the coils above described will of course give the same results when the gas is replaced by an uncongealable refrigerated solution, the circulation of which may be inverted, when the lower layers of the solution already concentrated must be frozen, by means of suitable apparatus illustrated in my U. S. patent application No. 363,928 and Patent No. 925,820. In this case the refrigerated brine passes through the tube 25 see Figs. 5, 6 and 7 and through one or the other of the valves 26, 27, one or the other of the tubes 28, 29 and one or the other of the collectors 30, 31 of the tank. In order to facilitate the uniform distribution of said brine, the tubes 28, 29 reach to near the bottom of the collectors 30, 31 and are surrounded each by a wall 32 respectively 33 provided with holes through which the brine coming out from the lower part of the tubes 28, 29 is evenly distributed into the collectors 30, 31. This solution enters, in one or in the other direction the freezing tubes 34 of the freezing tank and comes out at last through one or the other of the discharging tubes 35, 36 also provided with stop valves 37, 38, arranged at the upper part of the collectors 30, 31 and both inserted on the discharging pipe 39. Thus for instance by opening the valves 26, 38 the circulation of the refrigerated brine is effected in the direction shown by the arrows in full lines at Fig. 5, while closing said valves and opening the valves 27, 37 the circulation is effected in the opposite direction, viz. as indicated by the arrows in dotted lines. By causing said inversion to take place frequently a mass of interwoven ice crystals evenly permeable throughout the tank will be obtained.

Owing to the improvements in the apparatus for the concentration of solutions by means of freezing above described, it is possible to obtain, in one or two operations a high degree of concentration, that is until the solution contains 65% or even more of dry extract, so that these solutions may be afterward easily concentrated in an improved vacuum apparatus acting at very low temperatures, so as to obtain in a short time very concentrated crystallizable extracts according to the nature of the dissolved matter. For this purpose the concentrated solution, leaving for instance the tank 12ᵃ, is conveyed, through the tube 42 in a reservoir 43 before entering the evaporating apparatus. This apparatus (Figs. 1, 3, 4) consists of an evaporator 44 and two condensers 45, 46. The evaporator consists of a cylinder closed at both ends and provided at its sides and lower part with a double wall 44ᵃ. Two tube sheets 44ᵇ, 44ᶜ, connect, inside this cylinder the two end collectors 44ᵈ ending in tubes 44ᵉ 44ᵍ leading outward, said collectors are connected by means of a plurality of tubes 44ᶠ, the tube sheets filling the lower half of the cylinder also the double wall 44ᵃ surrounding the lower half of the outer surface of the cylinder. The recess 44ʰ between the walls 44ᵇ and 44ᶜ is also connected with the feeding and waste pipes by means of the tubes 44ⁱ, 44ᵏ. The condensers 45, 46 are of a quite similar form but their size is suitably chosen with regard to the size of the evaporator, moreover the refrigerating pipes 45ᶠ, 46ᶠ are regularly spaced all through the inner recesses of the condensers and their double walls 45ᵃ 46ᵃ completely surround said condensers. The inner recess 44ʰ of the evaporator 44 is connected with that of the condenser 45 by means of the tube 45ⁱ, Fig. 1, or, better, by means of a flat casing 45ⁱ of elongated form (Figs. 3, 4). The inner recesses 45ʰ, 46ʰ of the condensers 45, 46, are connected together through tubes 46ⁱ (Fig. 1) or preferably by means of a flat box 46ⁱ provided with means to stop the foam and prevent its passing from the evaporator into the condensers (Figs. 3, 4). Finally the inner recess 46ʰ of 46 communicates through the tubes 47 with the suction pipe 48 of a pump 49 said pipe 48 being also connected with the reservoir 51 of the concentrated solution.

In the tubes 44ᶠ and casing 44ᵃ of the evaporator 44 water at about 35–40° C. (more or less according to the kind of solution) is caused to circulate, while in the tubes and casing of the condensers 45, 46 refrigerating water at the lowest temperature available (12-15° C.) and water cooled at about its freezing point is respectively caused to run, the cold water being obtained by filtering the refrigerating water through the ice left in the refrigerating tank 12 after the displacement and reaching 46$^g$ through the tube 50. The condensed liquid in the condensers 45 and 46 may be drawn off by any well known means.

Though of course any other means of cooling or warming the water may be used, I obtain the lukewarm water used to heat the apparatus in the following manner: The water at the temperature of about 25° C. leaving the interchanger 4 is conveyed, by means of the pipe 52, in 53, that represents either the condenser of the steam engine or the double casing and the cooling apparatus of the gas motor. By suitably regulating the circulation it is easy to obtain water at a suitable temperature, for instance 40° C. The water thus heated enters the evaporator 44 passing through the tube 44$^e$ and comes out through the tube 55 that conveys it to the interchanger 56, leaving then this latter again at about the ordinary temperature, as in this interchanger the concentrated solution refrigerated at about 0° C. circulates in countercurrent.

The concentrated solution contained in the tank 43 connected through the coil 57 of the interchanger 55 with the tube 44$^i$ of the inlet to the evaporator 44, is drawn in through said coil of the interchanger, where it becomes heated before entering the evaporator 44. This result is obtained by reason of the suction effected by the pump 49 in the whole of the concentrating apparatus and the liquid is then discharged in collecting reservoir 51 of the reconcentrated solution, said reservoir being also connected, as already explained, with the suction pipe 48 of the pump 49 and besides through the tube 58 with the waste pipe 44$^k$ of the evaporator. The solution to be reconcentrated in the vacuum by means of the pump 49 goes from the reservoir 43 to the chamber 44$^h$ of the evaporator 44 and at last in the reservoir 51. In the evaporator 44, where the pressure is very low the solution to be reconcentrated and which is heated by the lukewarm water circulating in the tubes 44$^f$ will boil, the steam passing through the tube or slot and flat casing 45$^1$ (Fig. 4) enters the recess 45$^h$, where in contact with the refrigerated tubes 45$^f$ or casing is partially condensed, the remaining steam enters through the tube 46$^1$ the condenser 46$^h$, where in contact with the tubes 46$^f$ refrigerated at about 0° C., the vapor is completely condensed, so that, during the normal work, no steam will come out through the tube 47, the work of the pump being limited to the suction of the air or other gas contained in the apparatus or eventually dissolved in the concentrated solution.

In order to prevent, during the boiling of the liquid in the evaporator 44, the projection of some of the liquid or the foam into the condenser 45, I arrange in the slot 45$^1$ a stop 59 consisting of a longitudinal metallic plate serving to stop the rise of the foam, or I may provide any other suitable means to avoid this inconvenience.

After passing through the evaporator 44 the reconcentrated solution which is generally very viscous enters through the tube 58 in the reservoir 51 of the reconcentrated solution. When said reservoir is filled up I close the cocks 60, 61 and open 62 to connect the interior of the reservoir 51 with the atmosphere and restore the normal pressure whereupon said filled up reservoir may be taken away and an empty one substituted.

By the improved process and apparatus of concentration by evaporation in the vacuum above described, I aim to remove at a very low temperature (generally not exceeding 25° C.) so much water as is deemed necessary to insure the conservation of the extract and the crystallization of the crystallizable solution; it is even possible to evaporate at a lower temperature when the solution to be concentrated is very delicate (musts and perfumed juices and similar products). This result is obtained chiefly owing to the use of the condenser 46 in which water at the temperature of 0° is caused to circulate, said water causing the pressure in all the condensers to sink very low.

In order that the process above described may be fully understood, I will describe the use of same for the concentration of grape juice.

Suppose it is desired to concentrate grape juice containing originally 25% of dry extract; viz., 25 parts of extract in 100 parts of water. In order to concentrate it until 100 parts of extract be dissolved in 100 parts of water, it is necessary to separate 600 kilos of water per ton of must, which (supposing the juice is at the temperature of about 20° C.) requires the absorption of about 80,000 calories for each ton of juice. In order to concentrate a ton of juice per hour it is therefore necessary to use a machine capable of absorbing 80,000 calories per hour requiring a 40 hp. compressor, that is a 50 hp. motor including the running of the pumps. The thermic equivalent of 40 hp. absorbed by the compressor is of 26,000 calories per hour which added to the 80,000 calories absorbed form a total of 106,000 calories absorbed by the water of condensation. The condensing compound steam motor of at least 50 hp. (a much more powerful motor will generally be required in order to work also the tools of the plant) condenses at least $50 \times 6$ kg. $= 300$ kg. of steam per hour corresponding even at a low pressure to 300×535 that is about 160,000 calories, namely considering the losses, to 250,000 calories per hour sufficient to warm up from 15° to 40° C. a ton of water per hour. Supposing the water leaves the evaporator at 25° C. there would be 150,000 available calories to be disposed of, while to separate about 250 kg. of water from 400 kg. of already concentrated juice in order to obtain a crystallizable must, about 80,000 calories are required. The process might therefore be carried on even separating only 500 kg. of ice per ton by means of freezing.

If instead of using a steam motor a gas motor requiring a consumption (without considering the heat lost in the gas generator) of 400 gr. of coal per each horse-power-hour is used, (namely a total consumption of about 600 gr. per horse-power-hour) that is 20 kg. of coal per hour for a 50 hp. machine, about 150,000 calories would be available for heating the water, which added to the 100,000 absorbed by the condenser give a total amount of about 250,000 calories sufficient to warm up a ton of water from 15° to 40° C.

I claim:—

1. In an apparatus for concentrating solutions, the combination of means for partially freezing the solution, an evaporator, condensers connected with said evaporator, a pump connected with said evaporator and condensers for exhausting same, a plurality of tubes in said evaporator through which warm water may be circulated, pipes in one of said condensers, and pipe connections between said freezing means and the pipes in said condenser whereby ice water from said freezing means may be made to pass through said condenser.

2. In an apparatus for concentrating solutions, the combination of a refrigerating device consisting of a compressor, a refrigerant gas condenser and a freezing element, an evaporator, heating pipes in said evaporator, condensers for said evaporator, a pump for exhausting the evaporator and the condensers, a pipe connection leading from said freezing element to said evaporator, and pipe connections between the refrigerant gas condenser and the heating pipes in the evaporator whereby liquid which has become heated in passing through said refrigerant gas condenser is passed through said evaporator to evaporate the solution therein.

3. In an apparatus for concentrating liquid solutions, the combination of a compressor, condensing means, tanks for holding the solution to be concentrated, freezing pipes located in said tanks, an evaporator, heating pipes in said evaporator, condensers connected with said evaporator, a pump for exhausting said evaporator and the condensers, a pipe connection for conducting warm liquid from the said condensing means through the heating pipes in the evaporator, means for conducting the partially concentrated solution from one of the freezing tanks to said evaporator, and a pipe connection between one of said freezing tanks and one of the condensers whereby ice-water from said freezing tank may flow through such condenser.

4. In an apparatus for concentrating liquid solutions, the combination of a compressor, condensers, tanks for holding the solution to be concentrated, freezing pipes located in said tanks, means for automatically regulating the flow of the refrigerant through said freezing tanks, an evaporator, heating pipes in the evaporator, communicating condensers connected with said evaporator, tubes in said condensers adapted to receive a refrigerant fluid, a pump for exhausting said evaporator and the condensers, a pipe connection for conducting warm liquid from the said condensing means through the heating pipes in the evaporator, means for conducting the partially concentrated solution from one of the freezing tanks to said evaporator, and a pipe connection between one of said freezing tanks and one of the condensers whereby ice-water from said freezing tank may flow through the pipes in the condensers.

5. In an apparatus for concentrating liquid solutions, the combination of a compressor, condensers in communication with each other and with the compressor, tanks for holding the solutions to be concentrated, freezing pipes located in said tanks, fluid pressure controlling means for keeping constant the flow of the refrigerant through said freezing pipes, an evaporator and condensers connected in series, heating pipes in the evaporator and freezing pipes in said condensers, a pipe for conducting warm liquid from said condensers to the heating pipes in the evaporator, means for conducting the partially concentrated solution from one of the freezing tanks to the evaporator, a pipe connection between the other of the freezing tanks and one of the condensers, and a pump for exhausting the evaporator and the condensers.

6. In an apparatus for concentrating liquid solutions, the combination of a compressor, condensers in communication with each other and with the compressor, tanks for holding the solutions to be concentrated, freezing pipes located in said tanks, an evaporator and condensers in communication with each other, said evaporator and condensers comprising each a cylindrical vessel having partitioning walls at either end thereof providing chambers, pipes supported by said walls and effecting communication between the chambers, the pipes in said evaporator adapted to receive warm liquid from the condensers, the spaces around said pipes in the evaporator adapted to receive the partially concentrated solution from one of the freezing tanks, and the pipes in the condensers adapted to receive the fluid from one of the freezing tanks, the spaces around the pipes in the condensers adapted to receive the concentrated solution from the other of said freezing tanks, and a pump for exhausting the evaporator and the condensers.

7. A freezing tank for concentrating apparatus having transversely disposed partitions at either end thereof providing closed chambers, pipes supported by said partitions and affording communication between said chambers, and inlet and an outlet pipe communicating with each of said chambers, a vertically disposed and perforated wall inclosing said inlet pipe, and means for regulating the flow of the refrigerant solution through said pipes.

The foregoing specification signed at Turin, Kingdom of Italy, this third day of March 1909.

EUDO MONTI.

In presence of—
 CUMINO CORAO,
 LOUIS ALLAN.